United States Patent Office 2,899,408
Patented Aug. 11, 1959

2,899,408

COPOLYESTERS OF A GLYCOL, p,p'-SULFONYL-DIBENZOIC ACID AND AN ANILINE DERIVATIVE

John R. Caldwell and John W. Wellman, Kingsport, Tenn., assignors to Eastman Kodak Company, Rochester, N.Y., a corporation of New Jersey No Drawing. Application March 11, 1954
Serial No. 415,703

8 Claims. (Cl. 260—75)

This invention relates to polymeric materials, and particularly to fiber-forming linear polymers having improved dyeing properties.

A large number of synthetic linear condensation polymers are known to the art, and such polymers are ordinarily prepared by reacting a polybasic organic acid with a polyhydric alcohol, with or without the use of a condensation catalyst. The high molecular weight products which are thereby obtained are capable of being drawn into oriented fibers of the type described in U.S. Patent 2,071,250. The usual polyester fibers, such as those prepared from polyethylene terephthalate, are very difficult to dye, however, and special methods are usually employed in order to achieve any satisfactory degree of dyeing. Thus, at the present time, polyester fibers must be dyed at superatmospheric pressures with cellulose acetate dyes in order to obtain practical shades. This process requires the use of expensive equipment and is time consuming. An alternative process which has been used involved effecting the dyeing in the presence of a dye assistant or swelling agent such as phenol, cresol, benzoic acid, dichlorobenzene, or similar material. This process suffered the disadvantage, however, of often causing non-uniform swelling of the fiber with a resultant non-uniform application of the dye. Furthermore, most of the dyeing assistants were objectionable to use because of expense, toxicity, objectionable odor, or similar disadvantage.

It is accordingly on object of this invention to provide new linear polyesters from which fibers can be prepared which have improved dye affinity, especially for cellulose acetate type dyes.

Another object of the invention is to provide new and improved linear polyesters containing an aniline derivative in the main molecular chain.

Another object of the invention is to provide new and improved polyesters suitable for the manufacture of fibers which can be dyed to practical shades under ordinary conditions with or without the use of superatmospheric pressures or dyeing assistants.

Another object of the invention is to provide a method for incorporating N,N-di(β-hydroxyethyl) aniline or a derivative thereof into high molecular weight, fiber-forming polyesters.

Another object of the invention is to improve the dyeing properties of polyester fibers without substantially altering the melting point, tensile strength, elongation, or elastic recovery of the fibers.

Other objects will be apparent from the description and claims which follow.

These and other objects of the invention are accomplished by coreacting a polycarboxylic compound which can be either a polybasic organic acid or an ester thereof, a polyhydroxylic compound which can be either a polyhydric alcohol or an ester thereof, and an aniline derivative of the formula

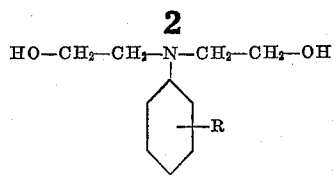

wherein R is a member of the group consisting of hydrogen, dialkylamino, dialkylsulfamido, dialkylcarboxamido, alkyl and chloro groups in which the alkyl groups contain from 1 to 4 carbon atoms.

The terpolymers of high molecular weight which are thus obtained can be drawn into oriented fibers which have improved affinity for dyes, and particularly for cellulose acetate type dyes. The modified polyesters prepared in accordance with this invention retain the desirable physical and chemical properties of the polyesters usually prepared by coreacting the polyhydric alcohol and the polybasic organic acid, and in addition have the improved properties imparted by the presence of the substituted aniline groups in the main molecular chain.

The terpolymers of this invention are conveniently prepared by heating a mixture of the polybasic acid, polyhydric alcohol, and aniline derivative as herein defined at atmospheric pressure, and preferably in the presence of a suitable condensation catalyst such as an amphoteric metal compound. The condensation reaction is desirably effected under an atmosphere of nitrogen and at a temperature of from about 150 to 300° C., and preferably from about 200 to 300° C. The condensation reaction is carried out until the product has a sufficiently high molecular weight to exhibit fiber-forming properties. The fiber-forming stage can be checked by touching the molten polymers with a rod and drawing the rod away. When the fiber-forming stage has been reached, a continuous filament of considerable strength will be pulled from the melt in this manner. This stage is generally reached when the polymer has an intrinsic viscosity of at least 0.4, the intrinsic viscosity being defined as $$\frac{\log_e N_r}{C}$$

in which $N_r$ is the viscosity of a dilute solution of the polymer in m-cresol divided by the viscosity of m-cresol in the same units and at the same temperature, and C is the concentration in grams of polymer per 100 cc. of solution. Measurement of the intrinsic viscosity is generally the most convenient method for following the course of the reaction. In most cases, it is usually desirable to continue the reaction until the intrinsic viscosity is above 0.4, and preferably above 0.6. The polymers thus obtained have excellent fiber-forming and cold drawing properties in addition to high melting points, tensile strength, elongation and elastic recovery. These polymers are crystalline, linear polymers which can be formed into fibers which are oriented along their axis.

In practicing this invention, any of the N,N-di(β-hydroxyethyl) aniline derivatives as defined herein can be used to prepare the modified polyesters embodying this invention. Thus unsubstituted N,N-di(β-hydroxyethyl) aniline itself can be used, or a derivative of this compound can be used having a substituent group in the ortho, meta or para position with respect to the amino group, the meta and para derivatives are preferred. The nuclear substitutent group can be varied rather widely and can include a lower alkyl group such as a methyl or ethyl group; a chloro group; a dialkyl amino group such as a dimethyl or diethyl amino group; a dialkyl sulfonamide group such as dimethylsulfonamide or diethylsulfonamide group; a dialkyl carboxamido group such as the dimethylcarboxamido or diethylcarboxamido groups. Such an aniline derivative is employed in an amount of from about 5 to about 25%, and preferably from about 10 to about 16 mole percent in the polyester. Since the substituted anilines used in practicing this invention are dihydroxy compounds, they function and take the place of part of the polyhydric alcohol ordinarily used in preparing polyester polymers. Thus in the process embodying this invention, the aniline derivative enters directly into the polymer chain and hence modifies the polymer in its molecular structure unlike the modification which is obtained by attempting to modify a preformed polymer ester.

The aniline derivatives employed in practicing the invention are typified by, but not limited to, such materials as N,N-di($\beta$-hydroxyethyl) aniline itself; and nuclearly substituted derivatives such as the alkylamino derivatives such as p-dimethylamino-N,N-di($\beta$-hydroxyethyl) aniline of the formula

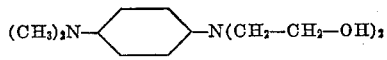

and m-diethylamino-N,N-di($\beta$-hydroxyethyl) aniline of the formula

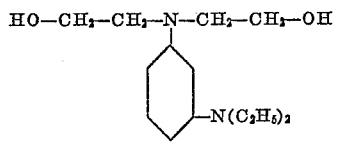

dialkyl sulfamido derivatives such as p-dimethyl sulfamido-N,N-di($\beta$-hydroxyethyl) aniline of the formula

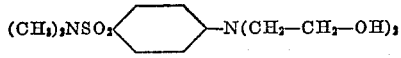

dialkyl carboxamido derivatives such as p-dimethylcarboxamido-N,N-di($\beta$-hydroxyethyl) aniline of the formula

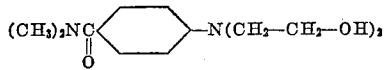

and the monoalkyl derivatives such as p-methyl-N,N-di($\beta$-hydroxyethyl) aniline of the formula

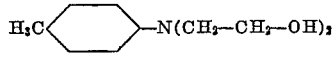

and m-ethyl-N,N-di($\beta$-hydroxyethyl) aniline of the formula

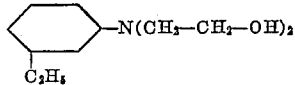

Other aniline derivatives within the scope of the invention include the corresponding ortho, meta and para isomers of these and similar compounds as defined herein. In the nuclear substituent groups, the alkyl radicals desirably are lower alkyl radicals of from 1 to 4 carbon atoms, and preferably methyl or ethyl radicals.

In practicing the invention, the aniline derivative is coreacted with a polybasic organic acid, or an ester thereof, and with a polyhydric alcohol which can be in the form of the free alcohol or esterified as described hereinafter. The reaction is desirably effected in the presence of a condensation catalyst, and preferably an organo-metallic catalyst, a large number of which are described in the copending applications of John R. Caldwell, Serial Nos. 313,061 through 313,071 inclusive, filed October 3, 1952, now U.S. Patents 2,744,089–2,744,098 inclusive and 2,744,129. The catalysts which are preferred for use in practicing this invention are the titanium compounds specifically disclosed in application Serial No. 313,072 now U.S. Patent 2,720,502, tin compounds as dihclosed in application Serial No. 313,078 now U.S. Patent 2,720,507, and aluminum compounds as disclosed in application Serial No. 313,077 now U.S. Patent 2,720,506. When such catalysts are employed in preparing the polyester, the esterified polybasic acids and esterified polyhydric alcohols can be readily used instead of the free acids and free polyhydric alcohols. It will, therefore, be understood that this invention includes the use of such acids and alcohols in the form of their esters as well as in the unesterified form, and includes the use of any condensation catalyst or no catalyst in accordance with usual practices.

Thus in practicing the invention any of the well known polybasic organic acids, and particularly the dibasic dicarboxylic acids can be employed for preparation of the modified polymers. These acids include the aliphatic dibasic acids or esters thereof of the formula $$R_1OOC-R_2-COOR_3$$

wherein $R_1$ and $R_3$ are either hydrogen or alkyl radicals containing from 1 to 10 carbon atoms, and $R_2$ is an aliphatic hydrocarbon radical. Thus typical aliphatic dibasic dicarboxylic acids which can be employed include oxalic acid, succinic acid, adipic acid, sebacic acid, $\alpha,\alpha$-dimethyl glutaric acid, dimethyl malonic acid, diglycollic acid, $\beta$-oxydipropionic acid, $\gamma$-oxydibutyric acid, maleic acid, fumaric acid, itaconic acid, and similar well known aliphatic dibasic acids. The acids of this type which are preferred are those containing at least 6 carbon atoms. The esters of such acids can also be used, and the alkyl esters wherein each alkyl group contains from 1 to 10 carbon atoms are desirably employed.

The invention is advantageously carried out employing an aromatic dicarboxylic acid or a diester thereof of the formula $$R_1OOC-R_2-X-R_3-COOR_4$$

wherein $R_1$ and $R_4$ each represents hydrogen or an alkyl radical containing from 1 to 10 carbon atoms and $R_2$ and $R_3$ each represents $(CH_2)_{n-1}$, wherein $n$ is an integer of from 1 to 5 inclusive, and X represents a divalent aromatic radical of the formula

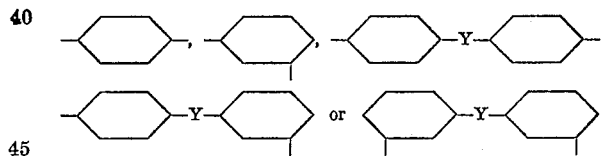

Y representing a radical of the formula

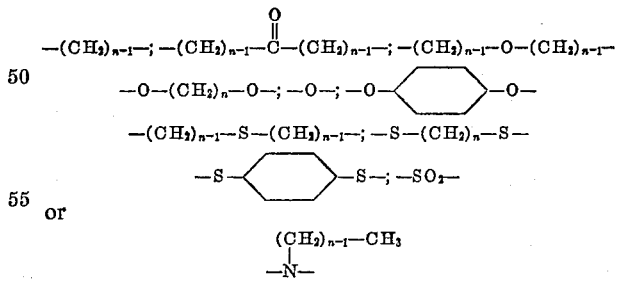

or

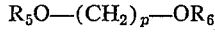

Of such acids, p,p'-sulfonyldibenzoic acid, terephthalic acid, 1,2-di(p-carboxyphenoxy) ethane, 1,2-di(p-carboxyphenyl) ethane and p,p'-diphenic acid are preferred, although any of the other acids or esters of such acids can be employed with good results.

The polyhydric alcohol or ester thereof is preferably an alpha, omega-dioxy compound having the formula $$R_5O-(CH_2)_p-OR_6$$

wherein $p$ is an integer of from 2 to 12 inclusive, and $R_5$ and $R_6$ each represents either a hydrogen atom, or an acyl radical containing from 2 to 4 carbon atoms. The polyhydric alcohols which are preferably employed in practicing the invention are the glycols which are commonly used in the preparation of polyesters such as ethylene glycol, trimethylene glycol, tetramethylene glycol, pentamethylene glycol, hexamethylene glycol, heptamethylene glycol, octamethylene glycol, and similar well known polymethylene glycols. The branched-chain glycols such as 2-methyl-pentanediol and 3-methyl-hexanediol can also be used. Other glycols which are suitable include the ether glycols such as diethylene glycol. Other polyhydroxy compounds containing 3 or more hydroxy radicals are also suitable as typified by glycerol, sorbitol, pentaerythritol, dipentaerythritol, β-methyl glycerol, 2-methyl-2-(hydroxymethyl) - 1,3 - propanediol, 1,2,4 - trihydroxybutane, and similar polyhydroxy compounds. Thus it is apparent that the dihydroxy or polyhydroxy compounds used in practicing this invention need not be the free hydroxy compounds when a catalyst of the organo-metallic type is employed to promote the polyester formation. The polyhydric alcohol or ester thereof is desirably employed in an amount such that the combined amount of such polyhydric alcohol and the aniline derivative gives an excess of hydroxy or substituted hydroxy radicals over the amount of carboxyl groups in the polybasic acid or esters employed in the reaction. Generally speaking, the hydroxy groups are desirably present in an amount of from about 1.3 to about 3 times the amount of carboxyl groups, although excess amounts of as much as 10 times or more can be employed in some cases.

It is thus apparent that the aniline derivatives described herein can be used for preparing any high molecular weight, high melting linear polyester having fiber-forming properties. For example, the aromatic dicarboxylic acids or diesters thereof which are preferably employed include such materials as β-hydroxyethyl diesters of p,p'-sulfonyldibenzoic acid, p,p'-sulfonyldibenzoic acid dibutyl esters, m,p'-sulfonyldibenzoic acid dipropyl esters, m,m'-sulfonyldibenzoic acid dihexyl esters, methyl terephthalate, hexyl terephthalate, isopropyl terephthalate, and various other esters having the following formulas:

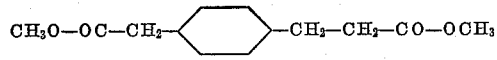
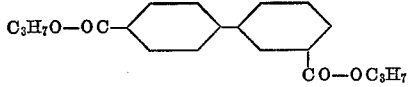
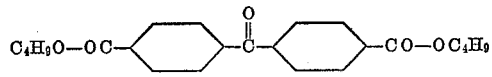
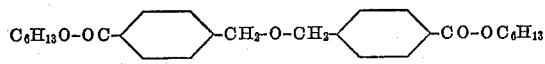
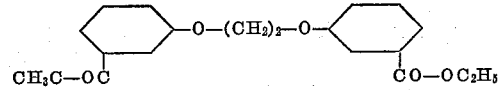
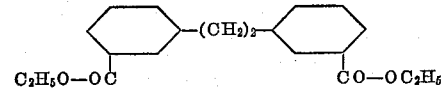
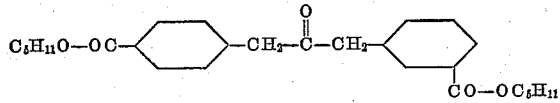
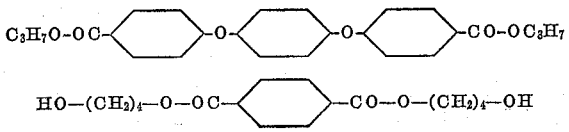

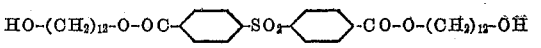
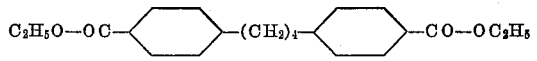
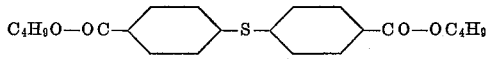
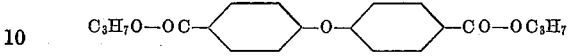
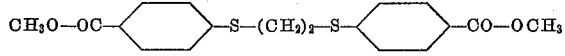
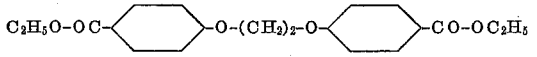
and
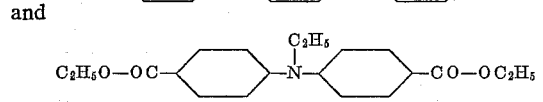

as well as the corresponding free acids.

The dihydroxy compounds which are preferably employed are the straight-chain alkane diols, i.e. the polymethylene glycols, wherein the hydroxy radicals are positioned at the two ends of the alkylene chain. As was indicated, the mono- or diesters of these glycols can also be employed, such as the acetates, propionates, and butyrates of these and similar glycols. Suitable ether glycols which can be employed instead of the polymethylene glycols or in conjunction therewith include diethylene glycol, triethylene glycol, tetraethylene glycol, bis(4-hydroxybutyl) ether, bis(3-hydroxypropyl) ether, and similar ether glycols.

When preparing high melting polyesters for the manufacture of synthetic fibers, the amount of aliphatic ether glycol is desirably minimized. Furthermore, the aromatic diacids or diesters preferably contain only p,p' linkages when high polymeric linear polyesters are desired.

The N,N-di(β-hydroxyethyl) aniline can be readily prepared by reacting aniline with ethylene oxide or ethylene chlorohydrin, or by any other known method. Similarly a substituted aniline such as aniline nuclearly substituted with an alkyl group, dialkylamino group, sulfamido group, chloro group or dialkylcarboxamido can be reacted with ethylene oxide or ethylene chlorohydrin to form the desired N,N-di(β-hydroxyethyl) aniline derivative.

When polyesters are prepared in accordance with this invention, the reaction is desirably effected under an inert atmosphere, and preferably under anhydrous conditions. The reaction is effected at atmospheric pressure, and at an elevated temperature for a period of about 1 hour. Thereafter it is usually desirable to reduce the pressure on the reaction mixture to below about 15 mm. Hg and to raise the temperature of the reaction mixture for a period of from 1 to 6 hours. This permits any alcohol or other volatile material to distill out of the highly viscous polymer melt.

The polymers thus obtained can then be employed in the preparation of fibers or other articles by the usual methods. The polyesters embodying this invention are especially suitable for conversion into fibers by melt-spinning methods. The spun fibers are usually drafted and heat treated in accordance with well known practice to give high melting synthetic fibers of excellent tensile strength.

The modified polyesters of this invention can also be employed for making sheets and films, or for the manufacture of molding products and similar materials. The polymers are readily dyed with cellulose acetate type dyes and also shown some affinity for certain classes of acid wool, direct cotton and vat dyes. Although a dyeing assistant is not necessary, one can be used when particularly heavy or dark shades are desired.

The invention is illustrated by the following examples of certain preferred embodiments thereof. The examples are included merely for purposes of illustration and are not intended to limit the scope of the invention unless otherwise specifically indicated.

*Example 1*

Four hundred and twenty grams (1.0 mole) of p,p'-sulfonyldibenzoic acid dibutyl ester, 27 g. (0.15 mole) of N,N-di($\beta$-hydroxyethyl) aniline, and 160 g. (1.5 mole) of pentamethylene glycol were placed in a reaction vessel equipped with a stirrer, a short distillation column, and an inlet for purified nitrogen. A solution of 0.05 g. sodium titanium butoxide in 2 cc. of butyl alcohol was added as catalyst, and the mixture was stirred at 200–210° C. in an atmosphere of nitrogen. Butyl alcohol distilled rapidly and the ester interchange was complete in about one hour. The temperature was then raised to 270° C. and held for 30 minutes. A vacuum of 0.5 mm. was applied and the melt was stirred at 265–270° C. for 2 hours. A colorless, high viscosity product was obtained. The inherent viscosity was 0.70–0.80. Fibers were made by a melt-spinning process. They stuck to the hot bar at 210–215° C. The fibers can be dyed to dark shades with cellulose acetate dyes applied at boiling temperature.

*Example 2*

A mixture of 1 mole of p,p'-sulfonyldibenzoic acid dibutyl ester, 0.15 mole of N,N-di($\beta$-hydroxyethyl) aniline, and 1.5 mole of hexamethylene glycol was heated at 200–210° C. under nitrogen in the presence of sodium titanium butoxide. After an hour, the temperature was raised to 270° C. and held for 30 minutes. The reaction mixture was then subjected to a vacuum of about 0.5 mm., and the melt was stirred at 265–270° C. for two more hours. The product thereby obtained was formed into fibers which had a sticking temperature of 215–220° C., and which can be dyed with cellulose acetate dyes.

*Example 3*

A mixture of 1.0 mole of p,p'-sulfonyldibenzoic acid dibutyl ester, 0.20 mole of p-dimethylamino-N,N-di($\beta$-hydroxyethyl) aniline and 1.5 moles of pentamethylene glycol was reacted as described in Example 1. The melt was spun into fibers having a sticking temperature of 200–210° C. These fibers could be dyed to heavy shades with cellulose acetate dyes, and can also be dyed with some types of acid wool dyes.

*Example 4*

A mixture of 1.0 mole of p,p'-sulfonyldibenzoic acid dibutyl ester, 0.1 mole of m-diethylamino-N,N-di($\beta$-hydroxyethyl) aniline and 1.5 moles of hexamethylene glycol was heated and stirred for 1 hour at a temperature of 200–210° C. under an atmosphere of nitrogen, and in the presence of 0.05 g. of sodium titanium butoxide. The temperature was then raised to 270° C. at atmospheric pressure for 30 minutes. A vacuum of 0.5 mm. was then applied, and the melt was stirred at 267–270° C. for 2 hours. Fibers spun from the resulting modified polymer stuck to the hot bar at 220–230° C. These fibers dyed well with cellulose acetate dyes and some types of acid wool dyes.

*Example 5*

The process as described in Example 1 was repeated using 0.25 mole of p-dimethylsulfamido-N,N-di($\beta$-hydroxyethyl) aniline to give a polymer which was melt spun into fibers which stuck to the hot bar at 180–190° C. These fibers dyed readily with cellulose acetate dyes.

*Example 6*

A mixture of 1 mole of the butyl ester of p,p'-diphenic acid, 0.15 mole of N,N-di($\beta$-hydroxyethyl) aniline and 1.5 moles of pentamethylene glycol was reacted in a similar manner to give a polymer which spun into fibers having improved dyeing properties.

*Example 7*

Similar results were obtained with a mixture of 1 mole of the ethyl ester of 1,2-di(p-carboxyphenoxy) ethane, 0.15 mole of N,N-di($\beta$-hydroxyethyl) aniline and 1.5 moles of pentamethylene glycol.

*Example 8*

Fibers were prepared from the polymer of 1.0 mole of the methyl ester of 1,2-di(p-carboxyphenyl) ethane, 0.15 mole of N,N-di($\beta$-hydroxyethyl) aniline and 1.5 moles of pentamethylene glycol. The fibers stuck at 190–210° C. and dyed readily with cellulose acetate dyes.

*Example 9*

One hundred and 94 g. (1.0 mole) of dimethyl terephthalate, 27 g. (0.12 mole) of p-dimethylamino-N,N-di-($\beta$-hydroxyethyl) aniline, and 124 g. (2.0 moles) of ethylene glycol were placed in a reaction vessel as described in Example 1. A solution of 0.10 g. lithium aluminum ethoxide in 5 cc. ethyl alcohol was added as catalyst. The mixture was stirred at 190° C. until the distillation of methyl alcohol practically stopped. The temperature was then raised to 270–280° C. where it was held for one hour. A vacuum of 0.2 mm. was applied and the melt was stirred at 270°–280° C. for 3 to 4 hours. A product having an inherent viscosity of 0.80 in 60 phenol-40 tetrachlorethane was obtained. Fibers spun from this composition can be dyed with cellulose acetate dyes and some acid wool dyes. The fibers have a sticking temperature of 200–205° C.

*Example 10*

Similar results were obtained using 0.15 mole of p-dimethyl carboxamido-N,N-di($\beta$-hydroxyethyl) aniline instead of the aniline derivative employed in the preceding example.

Similar results are obtained using other combinations of a polybasic organic acid, a polyhydric alcohol, and an aniline derivative as defined herein. As can be seen from the examples, either or both of the dibasic acid and the polyhydric alcohol can be esterified in practicing this invention, or both can be in the unesterified form. Mixtures of any of these or similar reactants can be employed in practicing the invention to give polymers having desired properties.

The polymers embodying the invention can be prepared in accordance with the usual processes for making polyesters, including either batch or continuous processes as desired. The products thus obtained are particularly valuable for preparing synthetic fibers of good mechanical properties and improved affinity for dyes. The modified polyesters, however, can be employed for making clear films which can be employed in the manufacture of photosensitive materials such as either black-and-white or color photographic film. Such films can be prepared in accordance with well known practice, either by deposition of a molten layer onto a suitable film-forming surface, or by deposition from a suitable solvent onto a rotating drum. The modified polymers of this invention can also be used for any of the other applications in which the prior polyesters could be used, since the desirable properties of the copolymer are retained in the terpolymer of this invention.

When using the modified polymers of this invention, any of the well known compounding ingredients which are ordinarily employed in conjunction with synthetic resins can be used, and the polymers can be admixed with similar or dissimilar polymers as desired. Fibers are most conveniently prepared from these polymers by melt-spinning processes, but the polymers can be spun from a solution in a suitable organic solvent such

We claim:
1. The method which comprises coreacting at a temperature of 150–300° C. to an inherent viscosity of at least 0.4, a mixture of a first compound selected from the group consisting of dihydric alcohols and organic acyl esters thereof wherein the acyl group contains 2–4 carbon atoms, an alkyl diester of p,p'-sulfonyldibenzoic acid wherein the alkyl group contains 1–10 carbon atoms and an aniline derivative of the formula

HO—CH₂—CH₂—N—CH₂—CH₂—OH
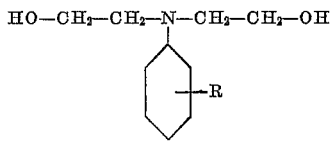

wherein R is a member of the group consisting of hydrogen, dialkylamino, dialkylsulfamido, dialkylcarboxamido, alkyl and chloro groups in which the alkyl groups contain from 1 to 4 carbon atoms, said aniline derivative amounting to from about 5 to about 25% of said mixture and the combined amount of said aniline compound and said first compound amounting to at least 1.3 times the molar amount of said diester.

2. The method according to claim 1 wherein the dihydric alcohol is a polymethylene glycol.

3. The method according to claim 1 wherein the aniline derivative is N,N-di(β-hydroxyethyl)aniline.

4. The method according to claim 1 wherein the aniline derivative is p-dimethylamino-N,N-di(β-hydroxyethyl)aniline.

5. The method according to claim 1 wherein the aniline derivative is m-diethylamino-N,N-di(β-hydroxyethyl)aniline.

6. The method according to claim 1 wherein the aniline derivative is p-dimethylsulfamido-N,N-di(β-hydroxyethyl)aniline.

7. A linear condensation polymer of a first compound selected from the group consisting of dihydric alcohols and organic acyl esters thereof wherein the acyl group contains 2–4 carbon atoms, a second compound consisting of an alkyl diester of p,p'-sulfonyldibenzoic acid wherein the alkyl group contains 1–10 carbon atoms and a third compound of the formula HO—CH₂—CH₂—N—CH₂—CH₂—OH
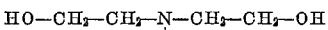
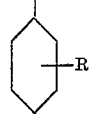

wherein R is a member of the group consisting of hydrogen, dialkylamino, dialkylsulfamido, dialkylcarboxamido, alkyl and chloro groups in which the alkyl groups contain from 1 to 4 carbon atoms, said polymer having an inherent viscosity of at least 0.4 and containing 5–25% by weight of said third compound and a combined amount of said third compound and said first compound amounting to at least 1.3 times the amount of said second compound.

8. A synthetic fiber of a polymer as defined in claim 7.

References Cited in the file of this patent
UNITED STATES PATENTS

| 2,647,104 | Shivers | July 28, 1953 |
| 2,739,958 | Lincoln et al. | Mar. 27, 1956 |

FOREIGN PATENTS

| 572,671 | Great Britain | Oct. 18, 1945 |